(12) United States Patent
Hannah

(10) Patent No.: US 6,384,838 B1
(45) Date of Patent: May 7, 2002

(54) OPTIMIZED LOOKUP TABLE METHOD FOR CONVERTING YUV PIXEL VALUES TO RGB PIXEL VALUES

(75) Inventor: Eric Cabot Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/425,231

(22) Filed: Apr. 17, 1995

Related U.S. Application Data

(63) Continuation of application No. 08/143,528, filed on Oct. 25, 1993, now abandoned, which is a continuation of application No. 07/901,505, filed on Jun. 19, 1992, now abandoned.

(51) Int. Cl.$^7$ ................................................ G09G 5/04
(52) U.S. Cl. ........................................ 345/601; 345/604
(58) Field of Search ................................ 340/701, 703, 340/798, 799; 358/78, 80, 75, 76; 101/DIG. 29; 345/153, 154, 600, 601, 602, 603, 605, 589, 597, 604

(56) References Cited

U.S. PATENT DOCUMENTS

| | | | | |
|---|---|---|---|---|
| 4,598,282 A | * | 7/1986 | Pugsley ........................ 340/703 |
| 4,725,828 A | * | 2/1988 | Cowlishaw ................... 340/703 |
| 4,789,854 A | * | 12/1988 | Ishii ............................. 340/703 |
| 5,057,914 A | * | 10/1991 | Tsuji et al. .................... 358/80 |
| 5,060,060 A | * | 10/1991 | Udagawa et al. ............. 358/80 |
| 5,124,688 A | * | 6/1992 | Rumball ....................... 340/703 |
| 5,162,925 A | * | 11/1992 | Takaoka et al. .............. 358/80 |

* cited by examiner

Primary Examiner—Chanh Nguyen
(74) Attorney, Agent, or Firm—Blakely, Sokoloff, Taylor & Zafman LLP

(57) ABSTRACT

An efficient software-based method for converting Yuv color video pixel data to RGB color video pixel data for display on a computer video screen. The Yuv pixel data is used to construct an index value into an RGB LookUp Table (RGB LUT) which contains corresponding RGB video pixel values. The corresponding RGB video pixel value is then used to display the color video pixel data on the computer screen. In a first embodiment a 24-bit Yuv value directly indexes an RGB LUT containing 24-bit RGB values. This embodiment preserves all of the original color information. In a second embodiment a 24-bit YUV value directly indexes an RGB LUT containing 16-bit RGB values (565 RGB). The 16-bit RGB values are preselected to preserve the luminance component with minimal error by shifting any luminance error into larger chroma errors. In a third embodiment all 8-bits of the Y, a truncated 4-bits u, and a truncated 4-bits v of a 24-bit Yuv value are used to form a 16-bit index pixel value into an RGB LUT containing 24-bit RGB values corresponding to possible values of the 16-bit index pixel value. In this embodiment, using all 8-bits of Y in the index pixel value preserves the Y luminance component without error.

12 Claims, 3 Drawing Sheets

OPTIMIZED LOOKUP TABLE METHOD FOR CONVERTING YUV PIXEL VALUES TO RGB PIXEL VALUES

This is a continuation of application Ser. No. 08/143,528, filed Oct. 25, 1993, now abandoned, which is a continuation of application Ser. No. 07/901,505, filed Jun. 19, 1992, now abandoned.

BACKGROUND OF THE INVENTION

1. Field of the Invention

The invention relates generally to the field of playback/decoding of encoded digital video pixels and more specifically to an efficient software-based method for converting Yuv pixel data to RGB pixel data for displaying video data on computer video terminals.

2. Description of the Prior Art

Both in conventional analog video and digital computer video there is a strong need to minimize the amount of data that must be transferred in the video signal. The first compression mechanism used in encoding all current video technologies is to transform the camera color signals, RGB, into another color space, Yuv, which allows subsampling of the data stream across its u and v, chroma only, dimensions without substantial image degradation to human observers. This is possible because human vision encodes color perceptions into neural signals which transform Red, Green, and Blue signals into a Luminance component (i.e., Black and White style image signal) and two Chroma (color only) components. Another aspect of this neural encoding is that the density of chroma receptors is much less in the retina than the density of luminance receptors. Thus human color vision has much lower spatial sensitivity to chroma variations than to luminance variations. This allows data compression in the chroma subspace of video by subsampling the spatial variations of the chroma signals. The relationship between the Yuv and RGB color spaces is defined in the following equation sets 1 and 2.

$$Y=0.257R+0.504G+0.098B+16$$

$$U=-0.148R-0.291G+0.439B+128$$

$$V=0.439R-0.368G-0.071\ B+128 \quad \text{(EQ 1)}$$

$$R=1.164(Y-16)-0.002(U-128)+1.596(V-128)$$

$$G=1.164(Y-16)-0.391\ (U-128)-0.813(V-128)$$

$$B=1.164(Y-16)+2.018(U-128)-0.001(V-128) \quad \text{(EQ 2)}$$

When reconstructing the video images from encoded video data for display on a computer video screen, this color space data compression method presents two computational problems for a software-based decoder in a computer system. The first problem is to reconstruct a fully sampled digital signal of each pixel's color in the transformed color space, i.e., to undo the subsampling operation with as little loss as possible. The second problem is to efficiently convert the color space pixels from Yuv back to RGB so that they can be displayed on the computer video screen.

One example of how the first problem of undoing the subsampling operation is solved in a computer system is performing linear interpolation on 422 encoded Yuv pixel data. 422 encoded Yuv pixel data has the following sequence of color values:

$$Y_0 u_0 Y_1 v_0 Y_2 u_2 Y_3 v_2 \cdots.$$

This subsampled Yuv data stream is reconstructed by a computer system using a linear interpolation algorithm to approximate the odd numbered u and v components as:

$$Y_0 u_0 v_0$$

$$Y_1,\ u_1=(u_0+u_2)/2,\ v_1=(v_0+v_2)/2$$

$$Y_2 u_2 v_2$$

$$Y_3,\ u_3=(u_2+u_4)/2,\ v_3=(v_2+v_4)/2,\ \text{etc.}$$

The reconstructed Yuv data stream is referred to as supersampled Yuv pixel data.

After reconstructing each pixel of Yuv data from the subsampled Yuv data stream, the second problem of converting the supersampled Yuv pixel data to RGB pixel data for display on the computer screen is encountered. Some prior art methods used in computer systems for converting Yuv pixel data to RGB pixel data are using special hardware converters to solve the EQ 2 set of equations, solving the EQ 2 set of equations using a software algorithm, and using well-known Color LookUp Table (CLUT) decoding. Each of these Yuv to RGB pixel conversion methods has drawbacks that limit their usefulness in computer video systems. Hardware converters are an effective but expensive method for converting video pixel data. Today's computers do not have the processing power to display quality motion video images by directly solving the EQ 2 set of equations using a software algorithm. And CLUT video decoding suffers from the drawbacks of color flashing, need to update the CLUT for scene changes, and color posterization in smooth gradient areas as will be further explained.

CLUT video decoding combines supersampled Yuv pixel bit values to compute an index into a Color Index LookUp Table (Cl LUT) typically having 32,768 (32K) entries, extracts from the Cl LUT an 8-bit Color LookUp Table Color Index (CLUT Cl) value which is stored in the framebuffer. This value in the framebuffer is then used to select one of 256 RGB pixel data entries in the CLUT. The selected RGB pixel data entry is then sent to three Digital-to-Analog Converters (DACs) which convert separately on the R, G, and B components of the RGB pixel data to drive the display on the computer video screen.

CLUT video decoding presents a number of problems for a computer software-based video pixel decoding system. During encoding, the video authoring program must derive a CLUT that best represents each video frame's colors. This calculation is quite expensive to perform since a three dimensional space of colored points (pixels) must be mapped into no more than 256 colors by the use of histogramming techniques. For example, when flesh tones are important (i.e., have more pixels in the scene) there might be hundreds of CLUT entries that only vary by a small amount in the flesh tone color regions, whereas blue sky, green grass color values might be compressed to less than 10 color table values. Using a generic system color palette (CLUT) gives unacceptable, cartoonish color effects. Since many frames can use the same palette the authoring program only includes the video CLUT in the encoded video data stream when there has been a scene change. When the authoring program outputs a new CLUT it must also output the Color Index LUT since calculating the Cl LUT is much too expensive for the software decoder to do in real time. In a computer software-based video pixel decoding system, updating the CLUT and Cl LUT for each scene change causes color flashing on the screen. Very bad scene colors result if the CLUT is not updated for each scene change.

The limited number of CLUT colors, typically 256, available for a given frame causes additional problems of posterization of smooth gradient areas, especially in a multiple window computer environment. Posterization is a contour line type representation of a smooth color gradient area. The problem of color posterization occurs when gradually changing colors are approximated by a smaller range of colors in the CLUT. In this case, one part of the gradually changing colors will all be approximated by a single color from the CLUT and the next part of the gradually changing colors will abruptly be approximated by another color from the CLUT. This results in a sharp change in color that poorly approximates the original gradual color change and creates a contour line appearance. In a multiple window computer environment, only one CLUT is available for all of the windows displayed on the computer screen. Since the colors needed from window to window may vary drastically, the limited number of colors available in the CLUT can cause serious color degradation.

Due to its limitations, CLUT video decoding is not optimal for video decoding in a computer system. Neither does solving equation set 2 using a software algorithm result in quality motion video for todays computer systems. And specialized hardware decoding systems are expensive, putting them out of the economic reach of many computer users. As a result of these factors there is a need for an efficient software-based method for converting Yuv pixel data to RGB pixel data such that quality motion video can be displayed on todays computer systems.

SUMMARY OF THE INVENTION

Accordingly, it is an object of the present invention to provide a software-based method for converting pixel data of a first format to pixel data of a second format such that quality motion video can be displayed on todays computer systems.

Another object of the present invention to provide a software-based method for converting pixel data of a first format to pixel data of a second format without the color flashing or posterization of smooth gradient areas exhibited by the CLUT conversion method.

The present invention provides a software-based computer method for converting pixel data of a first format to pixel data of a second format for display on a computer video screen compatible with the second format. Pixel data of the first format is used to create an index value which indexes a lookup table to find corresponding pixel data of the second format. The corresponding pixel data of the second format is then displayed on the computer video screen which is compatible with the second format.

The preferred embodiment of the present invention provides a software-based computer method for converting 24-bit Yuv pixel data (8-bits Y, 8-bits u, and 8-bits v) to 24-bit RGB pixel data (8-bits R, 8-bits G, and 8-bits B). The 8-bits of R, G, and B pixel data are then converted to three analog signals by three digital-to-analog converters (DACs). The three analog signals are used to drive the computer video screen for displaying the pixel data.

In another embodiment, the present invention provides a software-based computer method for converting 24-bit Yuv pixel data (8-bits Y, 8-bits u, and 8-bits v) to 16-bit 565RGB pixel data (5-bits R, 6-bits G, and 5-bits B). 565RGB has the advantage that it requires a smaller framebuffer and provides quality color conversion if the RGB conversion values are chosen such that the luminance error is minimized. The R, G, and B pixel data values are then converted to three analog signals by three digital-to-analog converters (DACs). The three analog signals are used to drive the computer video screen for displaying the pixel data.

Performance estimates of the software-based method of the present invention running on state-of-the-art microprocessors such as Intel 386™, 486™, or 586™ brand microprocessors show that the method of the present invention requires about the same processing power as the CLUT method. But the method of the present invention solves the CLUT problems of color flashing and posterization of smooth gradient areas.

Other objects, features, and advantages of the present invention will be apparent from the accompanying drawings and the detailed description that follows.

DETAILED DESCRIPTION OF THE PREFERRED EMBODIMENT

A software-based computer method for converting Yuv pixel data to RGB pixel data and displaying on a computer video screen is described. In the following description, numerous specific details are set forth, such as data compression schemes, data decompression schemes, table or array sizes, and bit lengths for digital data, etc., in order to provide a thorough understanding of the present invention. It will be apparent, however, to one skilled in the art that the present invention may be practiced without these specific details. In other instances, well-known methods have not been described in detail in order not to unnecessarily obscure the present invention.

Figure 1:
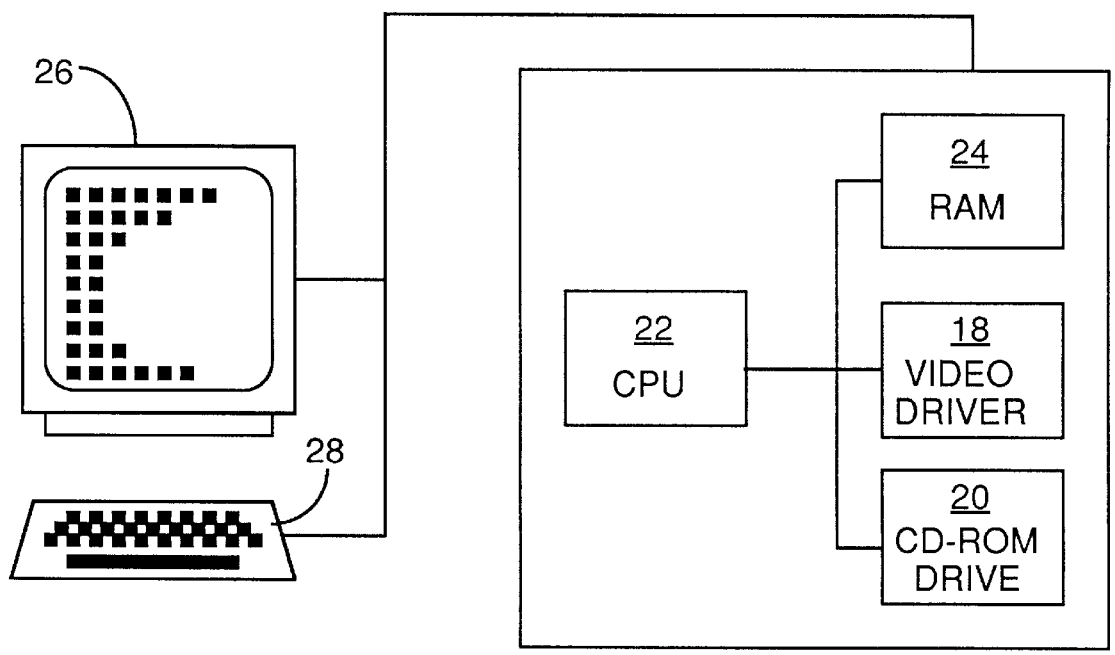
FIG. 1 is a block diagram of a computer.

FIG. 1 illustrates a computer including video screen 26, video driver 18, central processing unit (CPU) 22, random access memory (RAM) 24, compact disk read-only-memory (CD-ROM) 20, and keyboard 28. Video screen 26 visually displays color video information to a computer user. Video driver 18 drives video screen 26 in response to RGB format pixel data to display color video information on video screen 26. CPU 22 receives color video pixel data in compressed Yuv format from CD-ROM 20, decompresses the pixel data, converts it to RGB pixel data, and drives the RGB pixel data to video driver 18. In the preferred embodiment of the present invention, CPU 22 is a microprocessor such as an Intel 386™, 486™, or 586™ brand microprocessor. RAM 24 stores program instructions and data used by CPU 22 to decompress and convert the pixel data. CD-ROM 20 contains compressed Yuv format pixel data. Keyboard 28 allows the computer user to communicate with CPU 22.

Figure 2:
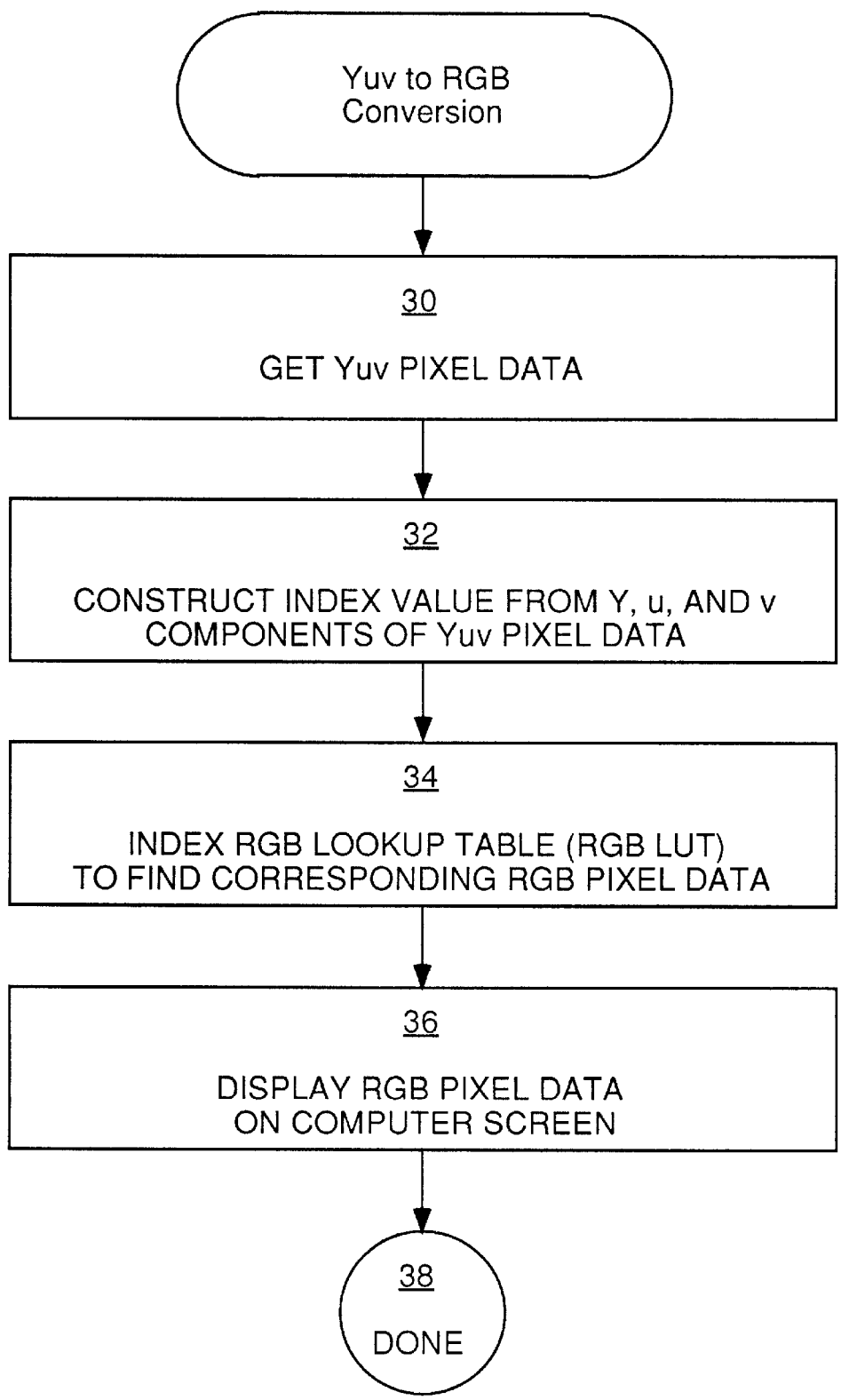
FIG. 2 is a flowchart of the method for converting Yuv pixel data to RGB pixel data and displaying on a computer video screen.

FIG. 2 illustrates in flowchart form the pixel data conversion method of the present invention. The pixel data conversion method is performed by CPU 22 after CPU 22 has already decompressed the Yuv pixel data received from the CD-ROM drive 20. An example of a common decompression method is to perform linear interpolation on 422 compressed Yuv pixel data as described in the background description of the present patent application. The present invention uses the bits of the decompressed Yuv pixel data to form an index into a large LookUp Table, called an RGB LUT, that contains RGB pixel values corresponding to the supersampled Yuv pixel data values.

The method of the present invention begins in step 30 as illustrated in FIG. 2. At step 30, the CPU 22 retrieves the decompressed Yuv pixel data from a register or from RAM 24. It will be apparent that the pixel data may be stored in other ways. In the preferred embodiment the Yuv pixel data consists of 8-bits of Y pixel data, 8-bits of u pixel data, and 8-bits of v pixel data that together form a 24-bit video pixel color value as shown in the following 24-bit Yuv video pixel data format.

```
 ┌──────┬──────┬──────┐
 │  Y   │  u   │  v   │
 └──────┴──────┴──────┘
23     16,15  8,7    0
```

Step 32 is used to construct an index value from the 24-bit Yuv pixel data. The index value can be the same as the 24-bit Yuv pixel data. In this case, all of the color data contained in the 24-bit Yuv pixel data is preserved in the RGB LUT conversion. A 24-bit index value can index a 16,777,216 (16M) array of R, G, and B values. Another method of forming the index value is to combine the most significant 5-bits of Y pixel data, the most significant 5-bits of u pixel data, and the most significant 5-bits of v pixel data to form a 15-bit index value. A 15bit index value can index a 32,768 (32K) array of R, G, and B values. Yet another method of forming the index value is to retain all of the Y bits and truncate the u and v components. The advantages of this latter method of forming the index value will be described in conjunction with FIG. 3.

One clear advantage of truncating bits in forming the index value is that the size of the RGB LUT is reduced. For example, a 24-bit index value requires an RGB LUT of 16,777,216 (16M) entries of RGB pixel data. A 15-bit index value requires an RGB LUT of 32,768 (32K) entries. However, video color information is lost when bits are truncated in forming the index value. For example, using the most significant 5-bits of Y, u, and v to form the index value results in noticeable degradation of the video colors. But if truncation is done correctly the color information lost is not noticeable to the human eye.

In step 34 the index value from step 32 is used to address the RGB LUT to find the corresponding RGB pixel data conversion value. The RGB LUT contains one RGB pixel data entry for each index value. In one embodiment, full 24-bit RGB pixel data entries are stored in the RGB LUT as 8-bits of Red data, 8-bits of Green data, and 8-bits of Blue data. These are the same bit widths as the original RGB data before Yuv encoding. In another embodiment 565 RGB pixel data entries are stored in the RGB LUT as 5-bits Red, 6-bits Green, and 5-bits Blue. In this case the truncated RGB values are preselected to be as close as possible to the full 24-bit RGB values. This is done by setting each RGB value to be as close a match to the luminance value of the pixel as possible. In other words, luminance errors resulting from truncating 24-bit RGB into 565 RGB are shifted into bigger chroma errors by choosing a slightly altered 565 RGB value than the direct truncation of the RGB value would give. This achieves the best result for truncated RGB values because the human eye is less sensitive to chroma errors than luminance errors.

Equation sets 1 and 2 from the background description of the present invention are used to find the correct RGB or Yuv value for a given Yuv or RGB value, respectively. An example of selecting a 565 RGB value that is different from the direct truncation value to minimize the luminance error is as follows.

YUV={169, 162, 91} which implies a correct 24-bit RGB={119, 194, 246} or binary RGB={0111 0111, 1100 0010, 11110110}.

Truncating this 24-bit RGB value to 565 RGB gives binary 565 RGB={0111 0000, 1100 0000, 1111 0000} or 565 RGB={112, 192, 240}.

This has an implied Yuv={165, 160, 89}, which differs from the correct Yuv by: {−4, −2, −2}.

To correct the Y, or luminance, error the Green value can be increased by +8 in the 6-bit G representation.

Thus the corrected 565 RGB value is 565 RGB'={112, 200, 240 } which has an implied Yuv={169, 158, 86}.

The net error from the ideal value is: {0, −4, −5}. Thus the Y error is zero, at the cost of a larger chroma error in the u and v components.

In Step 36, the RGB pixel data obtained from the RGB LUT in step 34 is sent to the framebuffer of the video driver 18. The framebuffer is a memory map corresponding to each pixel on the computer video screen 26. Storing the appropriate RGB pixel value in a specific location in the framebuffer sets the color that will ultimately be displayed for that pixel on the computer video screen 26. The video driver 18 also contains three digital-to-analog converters (DACs), one for Red, one for Green, and one for Blue. The DACs convert the RGB pixel data received from the framebuffer and drive analog outputs into the computer video screen 26 to display the selected color video on the computer video screen 26.

Some advantages of the present invention are now described. One advantage of the RGB LUT method of the present invention is that many colors are available for a given video frame. The number of different colors available is determined by how many bits are used to construct the index value. The preferred embodiment uses a 16-bit index value that provides 65,536 (64K) different colors, thereby giving very accurate color conversion as perceived by the human eye. Therefore, the posterization problem of low gradient areas that is present for CLUT technology is not a problem with the RGB LUT method of the present invention. The availability of many colors is very important in a multi-window computer environment where a large variety of colors is needed to adequately display the colors of the various windows on the screen. Another advantage of the RGB LUT method of the present invention is that there is no need to refresh a CLUT or Cl LUT upon scene changes. In the present invention, the only video data transferred is Yuv video pixel data. Therefore, the color flashing problem of the CLUT method is not present in the RGB LUT method.

Figure 3:
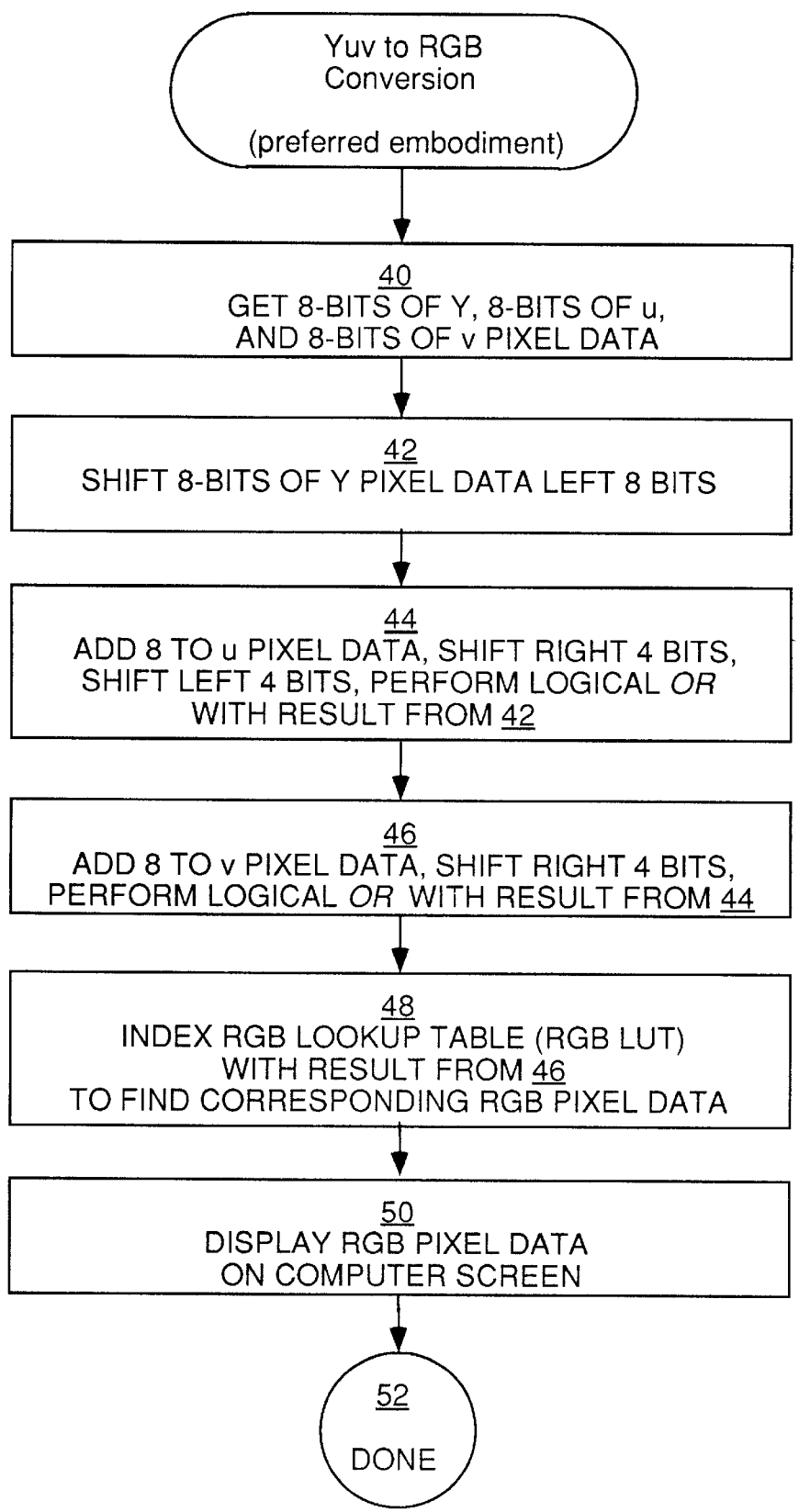
FIG. 3 is a flowchart of the preferred embodiment of the method for converting Yuv pixel data to RGB pixel data and displaying on a computer video screen.

FIG. 3 illustrates in flowchart form the preferred embodiment of the video pixel data conversion method of the present invention. This method preserves all of the bits of the Y component of the Yuv pixel data in order to preserve the Luminance of the video image and truncates the 4 least significant bits of the u and v Chroma components after rounding in order to reduce the size of the RGB LUT. Because the human eye is much more sensitive to luminance variations than to chroma variations, the color difference perceived by the human eye between this 16-bit RGB LUT method and the full 24-bit RGB LUT method is slight.

The preferred embodiment of the video pixel data conversion method begins in step 40 in FIG. 3. Step 40 is used to get the supersampled Yuv pixel data. This step consists of CPU 22 retrieving the Yuv pixel data from a register or from RAM 24. It will be apparent that pixel data may be stored in other ways. The supersampled Yuv pixel data consists of 8-bits of Y pixel data, 8-bits of u pixel data, and 8-bits of v pixel data that together form a 24-bit video pixel color value as shown in the following Yuv video pixel format (i.e. a first format).

```
┌─────┬─────┬─────┐
│  Y  │  u  │  v  │
├─────┼─────┼─────┤
23   16,15  8,7   0
```

However, in the preferred embodiment, the retrieval and manipulation of the Yuv pixel data is performed by CPU 22 separately on the 8-bits of Y pixel data, 8-bits of u pixel data, and 8-bits of v pixel data. Therefore, the 8-bits of Y, 8-bits of u pixel data, and 8-bits of v pixel data are retrieved and manipulated as separate 8-bit values as shown.

```
┌─────┐
│  Y  │
└─────┘
 7    0
┌─────┐
│  u  │
└─────┘
 7    0
┌─────┐
│  v  │
└─────┘
 7    0
```

Steps 42, 44, and 46 are used to form a 16-bit index value from the 8-bits of Y pixel data, 8-bits of u pixel data, and 8-bits of v pixel data as shown.

```
┌──────┬────────┬────────┐
│ Y>>0 │(u+8)>>4│(v+8)>>4│
└──────┴────────┴────────┘
15     8,7     4,3       0
```

Step 42 is used to shift the 8-bits of Y pixel data left 8 bits into bits 15 through 8 of the index value. Step 44 adds 8 to the 8-bit u pixel data for arithmetic rounding followed by shifting right 4 bits to truncate the 4 least significant bits and then shifting left 4 bits. The result is logically OR'ed with the result of step 42 such that step 44 provides bits 7 through 4 of the index value. Step 46 adds 8 to the 8-bit v pixel data for arithmetic rounding followed by shifting right 4 bits to truncate the 4 least significant bits. The result is then logically OR'ed with the result of step 44 such that step 46 provides bits 3 through 0 of the index value. Therefore, step 42 provides bits 15 through 8, step 44 provides bits 7 through 4, and step 46 provides bits 3 through 0 of the index value.

Step 48 uses the index value generated from steps 42, 44, and 46 to address the RGB LUT to find the corresponding RGB pixel data conversion value (i.e. a second format). The RGB LUT contains one RGB pixel data entry for each index value. In one embodiment, full 24-bit RGB pixel data entries are stored in the RGB LUT as 8-bits of Red data, 8-bits of Green data, and 8-bits of Blue data. These are the same bit widths as the original RGB data before Yuv encoding. In another embodiment, 565 RGB pixel data entries are stored in the RGB LUT as 5-bits Red, 6-bits Green, and 5-bits Blue. In this case, the truncated RGB values are preselected to be as close as possible to the full 24-bit RGB values. This is done by setting each RGB value to be as close a match to the luminance value of the pixel as possible. In other words, luminance errors resulting from truncating 24-bit RGB into 565 RGB are shifted into bigger chroma errors by choosing a slightly altered 565 RGB value than the direct truncation of the RGB value would give. This achieves the best result for truncated RGB values because the human eye is less sensitive to chroma errors than luminance errors.

Equation sets 1 and 2 from the background description of the present invention are used to find the correct RGB or Yuv value for a given Yuv or RGB value, respectively. An example of selecting a 565 RGB value that is different from the direct truncation value to minimize the luminance error is as follows.

YUV={169, 162, 91} which implies a correct 24-bit RGB={119, 194, 246} or binary RGB={0111 0111, 1100 0010, 1111 0110}.

Truncating this 24-bit RGB value to 565 RGB gives binary 565 RGB={0111 0000, 1100 0000, 1111 0000} or 565 RGB={112, 192, 240}.

This has an implied Yuv={165, 160, 89}, which differs from the correct Yuv by: {−4, −2, −2}.

To correct the Y, or luminance, error the Green value can be increased by +8 in the 6-bit G representation.

Thus the corrected 565 RGB value is 565 RGB'={112, 200, 240 } which has an implied Yuv={169, 158, 86}.

The net error from the ideal value is: {0, −4, −5}. Thus the Y error is zero, at the cost of a larger chroma error in the u and v components.

In step 50 the RGB pixel data obtained from the RGB LUT in step 48 is sent to the framebuffer of the video driver 18. The framebuffer is a memory map corresponding to each pixel on the video screen. Storing the appropriate RGB pixel value in a specific location in the framebuffer sets the color that will ultimately be displayed on the computer video screen 26. The video driver 18 also contains three digital-to-analog converters (DACs), one for Red, one for Green, and one for Blue. The DACs convert the RGB pixel data received from the framebuffer and drive analog outputs into the computer video screen 26 to display the selected color pixel on the computer video screen 26.

EXAMPLE

The following example illustrates the method of the present invention. The YUV pixel data is retrieved from either registers or RAM 24 by CPU 22 in three steps. First, binary Y pixel data {1010 1001} is retrieved followed by binary U pixel data {1010 0010}, and finally binary V pixel data {0101 1011}. The CPU 22 then creates the upper 8-bits of a 16-bit index value by logically shifting all 8-bits of the Y pixel data into the upper 8-bits of the 16-bit index value resulting in an intermediate 16-bit index value of {1010 1001 0000 0000}. The CPU 22 then creates the middle 4-bits of the 16-bit index value by rounding and truncating the U pixel data followed by logically OR'ing it with the 16-bit index value. To round the 8-bit U pixel data, the CPU 22 arithmetically adds binary {1000} to the U pixel data resulting in a U pixel data of {1010 1010}. The CPU 22 then truncates the lower four bits of the U pixel data in two steps of logical shifting. The CPU 22 first logically shifts the U pixel data right 4 bits resulting in a U pixel data of {0000 1010}. The CPU 22 then logically shifts the U pixel data left 4 bits resulting in a U pixel data of {1010 0000}. The CPU 22 then logically OR's the 16-bit index value with the 8-bit U pixel data to obtain the middle four bits of the index value as {1010 1001 1010 0000}. Next, the CPU 22 creates the lower 4-bits of the 16-bit index value by rounding and truncating the V pixel data followed by logically OR'ing it with the 16-bit index value. To round the 8-bit V pixel data, the CPU 22 arithmetically adds binary {1000} to the V pixel data resulting in a V pixel data of {0110 0011}. The CPU 22 then truncates the lower four bits of the V pixel data by logically shifting the V pixel data right 4-bits resulting in a V pixel data of {0000 0110}. The CPU 22 then logically OR's the 16-bit index value with the 8-bit V pixel data to obtain the lower four bits of the index value as {10100 1001 1010 0110}. Thus, the final 16-bit index value created by the CPU 22 is {1010 1001 1010 0110}. The CPU 22 then addresses the RGB LUT with the 16-bit index value to find the RGB pixel data corresponding to the original YUV pixel data. The RGB pixel data is then sent to the frame buffer of the video driver 18 for display on the video screen 26. In this manner, the present invention provides a software method that allows a general purpose computer to process and display video information.

Because the present invention is a software-based method for converting Yuv color pixel data to RGB color pixel data, the conversion speed of the computer's CPU 22 partly determines the ability of the computer to convert and display quality video images on the computer video screen. In the preferred embodiment of the present invention, CPU 22 is a microprocessor such as an Intel 386™, 486™, or 586™ brand microprocessor. Performance estimates for Intel 386™, 486™, and 586™ brand microprocessors using the method of the present invention are now presented.

The supersampling method for the 422 Yuv encoding described in the background description of the present patent application requires 4 READs, 3 WRITEs, 2 ADDs, and 1 SHIFT per pixel. The RGB LUT pixel conversion method of the preferred embodiment requires 4 SHIFTs, 2 ORs, 2 ADDs, 3 READs, and 3 WRITEs per pixel. The estimated number of microprocessor cycles for Intel 386™, 486™, and 586™ brand microprocessors to perform the required operations for supersampling and converting Yuv pixel data is shown in table 1.

TABLE 1

| Operation | 386™ Performance Estimates Cycles | 486™ Performance Estimates Cycles | 586™ Performance Estimates Cycles |
| --- | --- | --- | --- |
| SHIFT | 3 | 2 | 1 |
| OR | 2 | 1 | 1 |
| ADD | 2 | 1 | 1 |
| READ | 4 | 1 | 1 |
| WRITE | 2 | 1 | 1 |

Table 2 summarizes the estimated total microprocessor cycles required to perform the supersampling and RGB LUT pixel conversion method of the present invention.

TABLE 2

| Operation | Super Sampling Number | RGB LUT Number | Total | 386™ Cycles | 486™ Cycles | 586™ Cycles |
| --- | --- | --- | --- | --- | --- | --- |
| SHIFT | 1 | 4 | 5 | 15 | 10 | 5 |
| OR | 0 | 2 | 2 | 4 | 2 | 2 |
| ADD | 2 | 2 | 4 | 8 | 4 | 4 |
| READ | 4 | 3 | 7 | 28 | 7 | 7 |
| WRITE | 3 | 3 | 6 | 12 | 6 | 6 |
| Totals: | | | | 67 | 29 | 24 |

For comparison purposes, the CLUT pixel conversion method requires 5 SHIFTs, 2 ORs, 1 READ, and 1 WRITE per pixel. The number of total microprocessor cycles required for performing supersampling and CLUT pixel conversion are summarized in table 3.

TABLE 3

| Operation | Super Sampling Number | CLUT Number | Total | 386™ Cycles | 486™ Cycles | 586™ Cycles |
| --- | --- | --- | --- | --- | --- | --- |
| SHIFT | 1 | 5 | 6 | 18 | 12 | 6 |
| OR | 0 | 2 | 2 | 4 | 2 | 2 |
| ADD | 2 | 0 | 2 | 4 | 2 | 2 |
| READ | 4 | 1 | 5 | 20 | 5 | 5 |
| WRITE | 3 | 1 | 4 | 8 | 4 | 4 |
| Totals: | | | | 54 | 25 | 16 |

The results from Tables 2 and 3 can be used to calculate the number of video frames per second that can be displayed for various sizes of video images on a computer screen using the GLUT and RGB LUT methods. The frames per second that can be displayed using CLUT and RGB LUT methods with Intel 386™, 486™, and 586™ brand microprocessors running at 33 MHz, 33 MHz, and 66 MHz, respectively, is summarized in Table 4.

TABLE 4

| Method | | 386™/33 | 486™/33 | 586™/66 |
| --- | --- | --- | --- | --- |
| | FRAMES PER SECOND | | | |
| CLUT | 640 × 480 | 2 | 4 | 11 |
| | 320 × 240 | 8 | 17 | 45 |
| | 160 × 120 | 32 | 69 | 181 |
| RGB LUT | 640 × 480 | 2 | 4 | 9 |
| | 320 × 240 | 6 | 15 | 36 |
| | 160 × 120 | 26 | 59 | 143 |

Table 4 shows that the RGB LUT method of the present invention utilizes approximately the same amount of processing power for color video pixel supersampling and color decoding as the CLUT method of the prior art. In addition, the RGB LUT method of the present invention provides many more frame colors than the traditional 8-bit CLUT method and does not suffer from color flashing or require updating of CLUT and Cl LUT arrays.

Thus, a method for converting video pixel data has been described. The present invention provides an efficient method for software-based conversion of color video pixel data for display of quality motion video on a computer video screen.

What is claimed is:

1. In a computer system, a method for converting pixel data of a first format to pixel data of a second format for display on a computer video screen comprising the steps of:

retrieving a first pixel data of said first format, said retrieving being by a central processing unit, said first format having first, second, and third components, said first format having a first predetermined number of bits;

creating an index value from said first pixel data of said first format, said central processing unit creating said index value by performing logical operations on the first pixel data;

accessing a lookup table containing multiple pixel data of said second format with said index value to find a converted pixel data of said second format, said central processing unit accessing said lookup table, said second format having fourth, fifth, and sixth components, said second format having a second predetermined number of bits, said second predetermined number of bits being less than said first predetermined number of bits such that conversion errors are present in said converted pixel data with respect to said first pixel data, said converted pixel data of said second format corresponding to said first pixel data of said first format, said multiple pixel data having predetermined values, said predetermined values being chosen such that conversion errors that would otherwise exist in converting the first component are reduced at a cost of larger errors in converting the second and/or third components thereby causing the first component of the first pixel data to be substantially preserved in converted form, without conversion error in the converted pixel data; and displaying said converted pixel data of said second format on said computer video screen, said computer video screen being compatible with said second format.

2. The method of claim 1 wherein said first format is 24-bit Yuv, said second format is 16-bit RGB, and said first component is luminance.

3. The method of claim 1 wherein the first component is luminance.

4. In a computer system, a method for converting pixel data of a first format to pixel data of a second format for display on a computer video screen comprising the steps of:

retrieving a first pixel data of said first format, said retrieving being by a central processing unit, said first pixel data of said first format having first, second, and third components having first, second, and third predetermined numbers of bits, respectively;

creating an index value from said first, second, and third components of said first pixel data, said central processing unit creating said index value by performing logical operations on the first pixel data, said index value having all of the first predetermined number of bits of said first component, said index value having only a subset of said second and/or said third predetermined numbers of bits such that said index value has fewer bits than said first pixel data of said first format;

accessing a lookup table containing multiple pixel data of said second format with said index value to find a converted pixel data of said second format, said central processing unit accessing said lookup table, said second format having fourth, fifth and sixth components, said index value having fewer bits than said first pixel data causing conversion errors in said converted pixel data with respect to said first pixel data, said multiple pixel data of said second format having predetermined values, said predetermined values being chosen such that conversion errors that would otherwise exist in converting the first component are reduced at a cost of larger errors in converting the second and/or third components thereby causing the first component of said first pixel data to be substantially preserved, as a converted value, without conversion error in said converted pixel data, wherein no one of said first, second, third, fourth, fifth, and sixth components is the same as another; and displaying said converted pixel data of said second format on said computer video screen, said computer video screen being compatible with said second format.

5. The method of claim 4 wherein said first format is Yuv and said second format is RGB, said first, second, and third, components of said first format being Y, u, and v, respectively, said fourth, fifth, and sixth components of said second format being R, G, and B, respectively.

6. The method of claim 4 wherein said first format is 24-bit Yuv and said second format is 16-bit RGB, said first, second, and third, components of said first format being Y u, and v, respectively, said fourth, fifth, and sixth components of said second format being R, G, and B, respectively.

7. In a computer system, a method for converting pixel data of a first format to pixel data of a second format for display on a computer video screen comprising the steps of:

retrieving a first pixel data of said first format, said retrieving being by a central processing unit, said first pixel data of said first format having first, second, and third components having first, second, and third predetermined numbers of bits, respectively;

creating an index value from said first, second, and third components of said pixel data of said first format, said central processing unit creating said index value by performing logical operations on the first pixel data, said index value being created by a) using all of the first predetermined number of bits of said first component to form the most significant bits of said index value;

b) truncating a fourth predetermined number of the least significant bits of said second component and forming the middle bits of said index value with said second component, said fourth predetermined number being less than said second predetermined number;

c) truncating a fifth predetermined number of the least significant bits of said third component and forming the least significant bits of said index value with said third component, said fifth predetermined number being less than said third predetermined number, said index value having fewer bits than said first pixel data of said first format;

accessing a lookup table containing multiple pixel data of said second format with said index value to find a converted pixel data of said second format, said central processing unit accessing said lookup table, said pixel data of said second format having fourth, fifth and sixth components, said index value having fewer bits than said first pixel data causing conversion errors in said converted pixel data with respect to said first pixel data, said multiple pixel data of said second format having predetermined values said predetermined values being chosen such that conversion errors that would otherwise exist in converting the first component are reduced at a cost of larger errors in converting the second and/or third components thereby causing the first component of said first pixel data to be substantially preserved, as a convened value, without conversion error in said converted pixel data, wherein no one of said first, second, third, fourth, fifth, and sixth components is the same as another; and displaying said converted pixel data entry of said second format on said computer video screen, said computer video screen being compatible with said second format.

8. The method of claim 7 wherein said first format is Yuv and said second format is RGB, said first, second, and third, components of said first format being Y, u, and v, respectively, said fourth, fifth, and sixth components of said second format being R, G, and B, respectively.

9. The method of claim 7 wherein said first format is 24-bit Yuv and said second format is 16-bit RGB, said first, second, and third, components of said first format being Y u, and v, respectively, said fourth, fifth, and sixth components of said second format being R, G, and B, respectively.

10. In a computer system, a method for converting pixel data of a first format to pixel data of a second format for display on a computer video screen comprising the steps of:

retrieving a first pixel data of said first format, said retrieving being by a central processing unit, said first pixel data of said first format having first, second, and third components having first, second, and third predetermined numbers of bits, respectively;

creating an index value from said first, second, and third components of said pixel data of said first format, said central processing unit creating said index value, said index value being created by a) forming the most significant bits of said index value by logically shifting said first component into the most significant bit of said index value;

b) forming the middle bits of said index value by arithmetically adding a fourth predetermined number to said second component, logically shifting said second component right a fifth predetermined number of bits, logically shifting said second component left said fifth predetermined number of bits, and logically OR'ing said second component with said index value, said fifth predetermined number being less than said second predetermined number of bits;

c) forming the least significant bits of said index value by arithmetically adding a sixth predetermined number to said third component, logically shifting said third component right a seventh predetermined number of bits, and logically OR'ing said third component with said index value, said seventh predetermined number being less than said than said third predetermined number of bits, said index value having fewer bits than said first pixel data of said first format;

accessing a lookup table containing multiple pixel data of said second format with said index value to find a converted pixel data of said second format, said central processing unit accessing said lookup table, said pixel data of said second format having fourth, fifth and sixth components, said index value having fewer bits than said first pixel data causing conversion errors in said converted pixel data with respect to said first pixel data said multiple pixel data of said second format having predetermined values, said predetermined values being chosen such that conversion errors that would otherwise exist in converting the first component are reduced at a cost of larger errors in converting the second and/or third components thereby using the first component of said first pixel data to be substantially preserved, as a converted value, without conversion error in said converted pixel data, wherein no one of said first, second, third, fourth, fifth, and sixth components is the same as another; and displaying said converted pixel data entry of said second format on said computer video screen, said computer video screen being compatible with said second format.

11. The method of claim 10 wherein said first format is Yuv and said second format is RGB, said first, second, and third, components of said first format being Y, u, and v, respectively, said fourth, fifth, and sixth components of said second format being R, G, and B, respectively.

12. The method of claim 10 wherein said first format is 24-bit Yuv and said second format is 16-bit RGB, said first, second, and third, components of said first format being Y, u, and v, respectively, said fourth, fifth, and sixth components of said second format being R, G, and B, respectively.

* * * * *

UNITED STATES PATENT AND TRADEMARK OFFICE
CERTIFICATE OF CORRECTION

PATENT NO.    : 6,384,838 B1                                     Page 1 of 1
DATED         : May 7, 2002
INVENTOR(S)   : Hannah It is certified that error appears in the above-identified patent and that said Letters Patent is hereby corrected as shown below:

Column 10,
Line 17, delete "GLUT", insert -- CLUT --.

Column 11,
Lines 62, 64 and 67, delete "being", insert -- are --.

Column 12,
Lines 2, 57, 60 and 62, delete "being", insert -- are --.
Lines 56 and 61, before "said fourth", insert -- and --.

Column 14,
Line 11, delete "using", insert -- causing --.
Lines 23, 25 and 30, delete "being", insert -- are --.
Lines 24 and 28, before "said fourth", insert -- and --.

Signed and Sealed this

Twenty-first Day of January, 2003

JAMES E. ROGAN
*Director of the United States Patent and Trademark Office*